(12) United States Patent
Genta et al.

(10) Patent No.: US 8,751,869 B2
(45) Date of Patent: Jun. 10, 2014

(54) MICROPROGRAMMABLE DEVICE CODE SIGNATURE

(75) Inventors: Claudio Genta, Orbassano (IT); Alberto Manzone, Orbassano (IT)

(73) Assignee: C.R.F. Societa Consortile Per Azioni, Orbassano (IT)

( * ) Notice: Subject to any disclaimer, the term of this patent is extended or adjusted under 35 U.S.C. 154(b) by 366 days.

(21) Appl. No.: 12/848,857

(22) Filed: Aug. 2, 2010

(65) Prior Publication Data
US 2011/0191636 A1 Aug. 4, 2011

(30) Foreign Application Priority Data

Aug. 3, 2009 (EP) ..................................... 09425316

(51) Int. Cl.
*G06F 11/00* (2006.01)
(52) U.S. Cl.
USPC .............................................. 714/30; 714/37
(58) Field of Classification Search
None
See application file for complete search history.

(56) References Cited

U.S. PATENT DOCUMENTS

| | | | |
|---|---|---|---|
| 4,493,078 A | | 1/1985 | Daniels |
| 5,974,529 A | * | 10/1999 | Zumkehr et al. ............... 712/41 |
| 6,105,154 A | * | 8/2000 | Wang et al. .................... 714/732 |
| 6,415,394 B1 | * | 7/2002 | Fruehling et al. ............... 714/30 |
| 8,171,285 B2 | * | 5/2012 | Platt .............................. 713/165 |
| 2005/0251708 A1 | | 11/2005 | Bancel et al. |
| 2006/0236100 A1 | | 10/2006 | Baskaran et al. |
| 2007/0074031 A1 | | 3/2007 | Adams et al. |

FOREIGN PATENT DOCUMENTS

CN 101034991 9/2007

OTHER PUBLICATIONS

European Application No. EP 09425316: Partial European Search Report dated Jan. 25, 2010, 7 pages.

* cited by examiner

*Primary Examiner* — Michael Maskulinski
(74) *Attorney, Agent, or Firm* — Baker & Hostetler LLP

(57) ABSTRACT

A microprogrammable electronic device has a code memory storing a software and/or firmware code having instructions. The microprogrammable electronic device is configured to compute a signature of the code stored in the code memory, and to detect any corruption of the code stored in the code memory on the basis of the computed signature. The microprogrammable electronic device is characterized by being further configured to operate according to instruction cycles, each divided into a respective first and a respective second operating phase; to read a first instruction from the code memory at the first operating phase of an instruction cycle; to decode and execute the read first instruction at the second operating phase of the instruction cycle; to read a second instruction from the code memory at the second operating phase of the instruction cycle; and to compute the signature on the basis of the read second instruction.

12 Claims, 2 Drawing Sheets

MICROPROGRAMMABLE DEVICE CODE SIGNATURE

CROSS-REFERENCE TO RELATED APPLICATIONS

This application claims priority to European Patent Application No. 09425316.8, filed on Aug. 3, 2009, the contents of which are incorporated by reference herein in their entirety.

TECHNICAL FIELD

The present invention relates, in general, to a microprogrammable device, and, in particular, to a microprogrammable device configured to execute a code and at the same time check that the code is not corrupted.

BACKGROUND

As is known, a microprogrammable device is an electronic device comprising: a processor; a code memory storing a software and/or firmware code which, when the microprogrammable device is in use, is executed by the processor; and a data memory, in which values of variables used in executing the code are stored.

As is also known, the content of the code memory, i.e. the code, of a microprogrammable device may be altered, i.e. corrupted, by electromagnetic interference (EMI) to which the microprogrammable device is exposed.

To determine corruption of the code, a code signature is therefore computed cyclically and compared with a reference signature.

More specifically, signature computation comprises a logic-mathematical calculation involving all the elements stored in the code memory, and which is performed by the processor on the basis of a signature computation function normally forming part of the code stored in the code memory.

The reference signature, on the other hand, is computed when compiling the microprogrammable device code, and is stored in the microprogrammable device code memory at the same time as the code.

The signature computation function is executed periodically by the processor and normally has the lowest priority, i.e. is executed by the processor when it is not executing other code functions.

If the processor-computed signature does not match the reference signature stored in the code memory, the microprogrammable device is disabled to prevent damage.

The Applicant has observed, however, that, in the event the code is corrupted, developments in execution of the code are impossible to be predicted, which means execution of the signature computation function is no longer assured once the code is corrupted.

More specifically, in the event the code is corrupted, the signature may be computed wrongly or, worse still, may cease to be computed by the processor, so that corruption of the code may never be detected.

SUMMARY

The objective of present invention is then to provide a microprogrammable device which can alleviate the above cited drawback.

This objective is achieved by the present invention in that it relates to a microprogrammable electronic device, as claimed in the attached claims.

BRIEF DESCRIPTION OF THE DRAWINGS

For a better understanding of the present invention, a preferred embodiment, which is intended purely by way of example and is not to be construed as limiting, will now be described with reference to the attached drawings (all not to scale), wherein.

DETAILED DESCRIPTION OF ILLUSTRATIVE EMBODIMENTS

The following discussion is presented to enable a person skilled in the art to make and use the invention. Various modifications to the embodiments will be readily apparent to those skilled in the art, without departing from the scope of the present invention as claimed.

Thus, the present invention is not intended to be limited to the embodiments shown, but is to be accorded the widest scope consistent with the principles and features disclosed herein and defined in the appended claims.

According to the present invention, there is provided a microprogrammable electronic device comprising a code memory storing a software and/or firmware code comprising a plurality of instructions, said microprogrammable electronic device being configured to: compute a signature of the code stored in the code memory; and detect any corruption of the code stored in the code memory on the basis of the computed signature.

The microprogrammable electronic device according to the present invention is characterized by being further configured to: operate according to instruction cycles, each divided into a respective first and a respective second operating phase; read a first instruction from the code memory at the first operating phase of an instruction cycle; decode and execute the read first instruction at the second operating phase of said instruction cycle; read a second instruction from the code memory at the second operating phase of said instruction cycle; and compute said signature on the basis of the read second instruction.

According to the present invention, execution of each instruction in the code is therefore divided into two operating phases, in the same way as a two-stage pipeline.

That is, at the first operating phase of an instruction cycle, the code memory is used to read an instruction of the code, and, at the second operating phase of the instruction cycle, while the read instruction is being decoded and executed, the code memory is used to read an instruction to be used for the signature computation.

More specifically, the microprogrammable electronic device according to the present invention comprises a signature computation unit configured to: read said second instruction from the code memory at the second operating phase of said instruction cycle; compute said signature on the basis of the read second instruction; and detect any corruption of the code stored in the code memory on the basis of the computed signature.

The signature computation unit is preferably also configured to: compare said computed signature with a reference signature; and disable operation of the microprogrammable electronic device if the computed signature differs from the reference signature.

The signature computation unit is conveniently also configured to: read said reference signature from the code memory.

Figure 1:
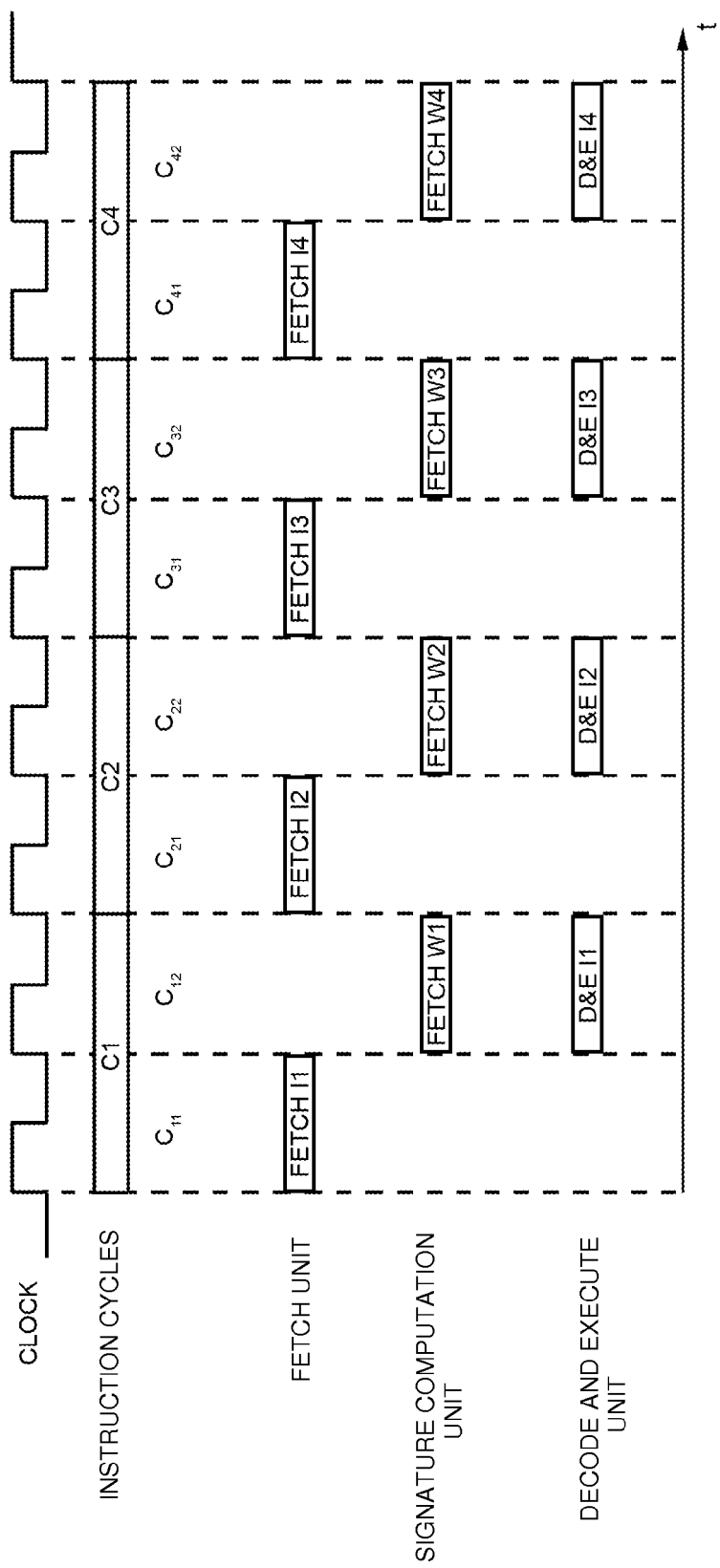
FIG. 1 shows a timing diagram of various operations performed by a microprogrammable electronic device in accordance with the present invention in relation to instruction cycles and to a clock of the microprogrammable electronic device.

For a clearer understanding of the present invention, FIG. 1 shows a timing diagram of various operations performed by a microprogrammable electronic device in accordance with the present invention, in relation to instruction cycles and to a clock of the microprogrammable electronic device.

More specifically, from the top to the bottom, the FIG. 1 timing diagram shows: a time graph of the clock of the microprogrammable electronic device; instruction cycles C1, C2, C3, C4 of the microprogrammable electronic device corresponding to the time graph of the clock; a timing, in relation to the instruction cycles C1, C2, C3, C4 and to the clock of the microprogrammable electronic device, of first fetch operations FETCH I1, FETCH I2, FETCH I3, FETCH I4 of first instructions I1, I2, I3, I4 from a code memory of the microprogrammable electronic device, said first fetch operations FETCH I1, FETCH I2, FETCH I3, FETCH I4 being performed by a fetch unit of the microprogrammable electronic device; a timing, in relation to the instruction cycles C1, C2, C3, C4 and to the clock of the microprogrammable electronic device, of second fetch operations FETCH W1, FETCH W2, FETCH W3, FETCH W4 of second instructions W1, W2, W3, W4 from the code memory, said second fetch operations FETCH W1, FETCH W2, FETCH W3, FETCH W4 being performed by a signature computation unit of the microprogrammable electronic device; and a timing, in relation to the instruction cycles C1, C2, C3, C4 and to the clock of the microprogrammable electronic device, of decode and execute operations D&E I1, D&E I2, D&E I3, D&E I4 of the first instructions I1, I2, I3, I4, said decode and execute operations D&E I1, D&E I2, D&E I3, D&E I4 being performed by a decode and execute unit of the microprogrammable electronic device.

More specifically, as shown in FIG. 1, the frequency of the clock of the microprogrammable electronic device is twice that of the instruction cycles C1, C2, C3, C4, each of which comprises a first operating phase, indicated C11, C21, C31, C41, respectively, in FIG. 1, and a second operating phase indicated C12, C22, C32, C42, respectively, in FIG. 1.

Moreover, as shown in FIG. 1, at the first operating phases C11, C21, C31, C41, the fetch unit of the microprogrammable electronic device performs the first fetch operations FETCH I1, FETCH I2, FETCH I3, FETCH I4 of the first instructions I1, I2, I3, I4 from the code memory, i.e. searches for and reads the first instructions I1, I2, I3, I4 in the code memory.

At second operating phases C12, C22, C32, C42, the signature computation unit performs the second fetch operations FETCH W1, FETCH W2, FETCH W3, FETCH W4 of the second instructions W1, W2, W3, W4 from the code memory, i.e. the signature computation unit searches for and reads the second instructions W1, W2, W3, W4 in the code memory, while, at the same time, the decode and execute unit performs the decode and execute operations D&E I1, D&E I2, D&E I3, D&E I4 of the first instructions I1, I2, I3, I4.

Figure 2:
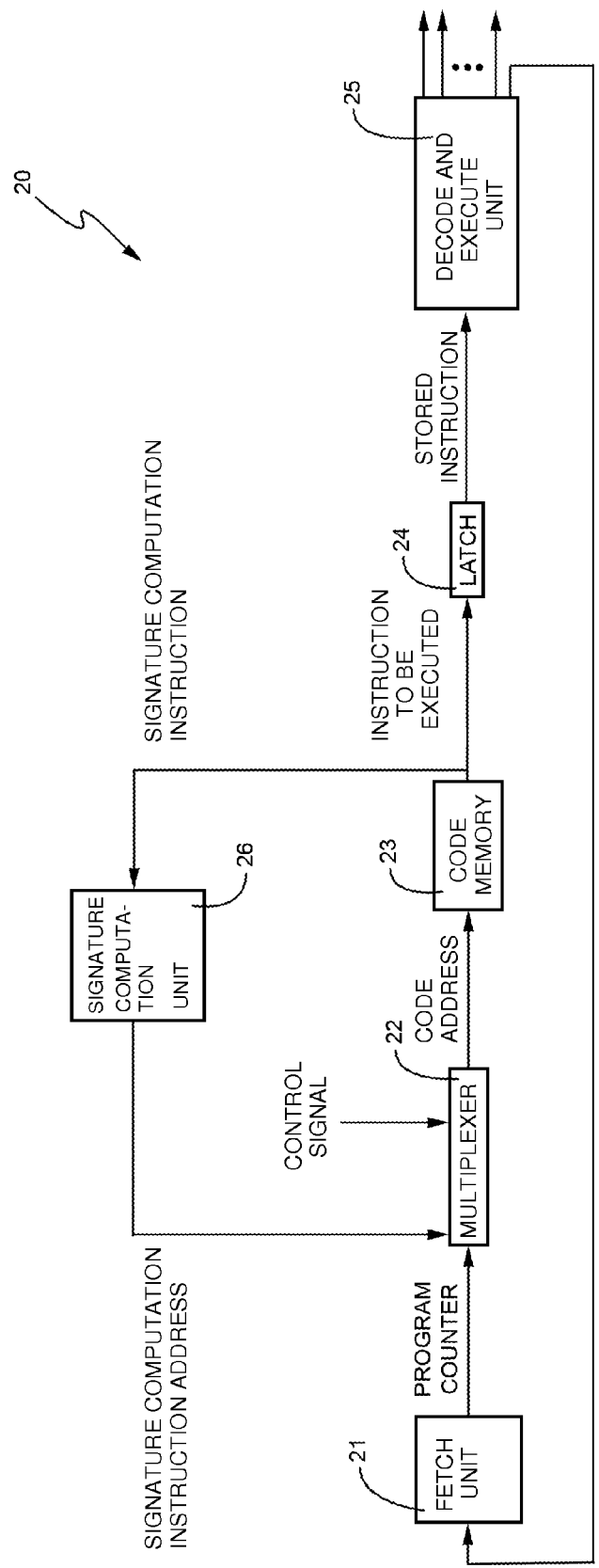
FIG. 2 shows an operating block diagram of a microprogrammable electronic device in accordance with a preferred embodiment of the present invention.

For an even clearer understanding of the present invention, in addition to FIG. 1, FIG. 2 shows an operating block diagram of a microprogrammable electronic device 20 in accordance with a preferred embodiment of the present invention.

More specifically, the microprogrammable electronic device 20 comprises: a fetch unit 21; a multiplexer 22; a code memory 23 storing a code comprising a plurality of instructions; a latch 24; a decode and execute unit 25; and a signature computation unit 26.

More specifically, the fetch unit 21 is configured to retrieve an instruction to be executed from the code memory 23, and accordingly supplies the multiplexer 22 with a program counter, i.e. a pointer to, i.e. an address of, the instruction to be executed.

Likewise, the signature computation unit 26 is configured to retrieve from the code memory 23 an instruction to be used for code signature computation, and accordingly supplies the multiplexer 22 with an address of the instruction to be used for code signature computation.

The multiplexer 22 is controlled by a control signal, so that the instruction to be executed or the instruction to be used for code signature computation is read in the code memory 23, i.e. either the instruction to be executed or the instruction to be used for code signature computation is retrieved from the code memory 23.

For example, with reference to both FIGS. 1 and 2, the multiplexer 22 may conveniently be controlled by the clock of the microprogrammable electronic device in order to alternate, at the rising edges of the clock, reading the first instruction I1. I2, I3 or I4 with reading the second instruction W1, W2, W3 or W4 from the code memory 23.

More specifically, at the first operating phases C11, C21, C31, C41, the multiplexer 22 allows the first instructions I1, I2, I3, I4 to be read/retrieved from the code memory 23 and stored in the latch 24, and, at the second operating phases C12, C22, C32, C42, allows the signature computation unit 26 to read/retrieve the second instructions W1, W2, W3, W4 from the code memory 23.

At the second operating phases C12, C22, C32, C42, the decode and execute unit 25 also reads and decodes and executes the first instructions I1, I2, I3, I4 stored in latch 24.

The decode and execute unit 25 then updates the program counter of the fetch unit 21 to point to another instruction to be executed and which logically follows the one just executed.

Finally, after computing the signature on the basis of all the instructions stored in the code memory 23, the signature computation unit 26 compares the computed signature with a reference signature also stored in the code memory 23.

If the computed signature differs from the reference signature, the signature computation unit 26 disables operation of, i.e. deactivates, the microprogrammable electronic device 20 to prevent it causing any damage.

The operations performed by the signature computation unit 26 to compute the signature and compare the computed signature with the reference signature may preferably be based on a cyclic redundancy check (CRC) method, e.g. CRC-32 (32-bit).

The microprogrammable electronic device 20 may conveniently comprise a first processor configured to implement the fetch unit 21, the latch 24, and the decode and execute unit 25, and a coprocessor configured to implement the signature computation unit 26. In which case, the processor and the coprocessor share use of the code memory 23 by means of the multiplexer 22.

The advantages of the present invention are clear from the above description.

In particular, it is important to note how the time taken to compute the signature according to the present invention is predictable and equal to the number of instructions stored in the memory code, multiplied by the length of an instruction cycle, i.e. by twice the length of an operating phase.

Another advantages lies in the fact that, in the event the code is corrupted, correct computation of the signature is unaffected by the content or by any corruption of the content of the code memory.

Clearly, changes may be made to the present invention without, however, departing from the scope of the invention as defined in the appended claims.

What is claimed:

1. A microprogrammable electronic device comprising a code memory storing a code comprising a number of instructions, the microprogrammable electronic device being configured to at least:
   operate according to instruction cycles, each instruction cycle divided into a respective first and a respective second operating phase;
   read a first instruction from the code memory at the first operating phase of an instruction cycle;
   decode and execute the read first instruction at the second operating phase of the instruction cycle;
   the microprogrammable electronic device comprising a signature computation unit that is configured to at least:
      read a second instruction from the code memory at the second operating phase of the instruction cycle concurrently with the microprogrammable electronic device decoding and executing the first read instruction, the second operating phase having a length equal to a length of the first operating phase;
      compute a signature of the code on the basis of the read second instruction; and
      detect a corruption of the code stored in the code memory on the basis of the computed signature differing from a reference signature.

2. The microprogrammable electronic device of claim 1, wherein the signature computation unit is further configured to at least:
   disable operation of the microprogrammable electronic device, in response to detecting the corruption of the code stored in the code memory.

3. The microprogrammable electronic device of claim 1, wherein the signature computation unit is further configured to at least:
   compute the signature on the basis of a cyclic redundancy check (CRC).

4. The microprogrammable electronic device of claim 1, wherein the signature computation unit is further configured to at least:
   compute the signature of the code on the basis of all instructions stored in the code memory.

5. A non-transitory medium bearing instructions that, when executed by a microprogrammable electronic device, cause the microprogrammable electronic device to perform operations comprising:
   operating according to instruction cycles, each instruction cycle divided into a respective first and a respective second operating phase;
   reading a first instruction from a code memory storing a code at the first operating phase of an instruction cycle;
   decoding and executing the read first instruction at the second operating phase of the instruction cycle;
   reading a second instruction from the code memory at the second operating phase of the instruction cycle concurrently with the microprogrammable electronic device decoding and executing the first read instruction, the second operating phase having a length equal to a length of the first operating phase;
   computing a signature of the code on the basis of the read second instruction; and
   detecting a corruption of the code stored in the code memory on the basis of the computed signature differing from a reference signature.

6. The non-transitory medium of claim 5, further bearing instructions that, when executed by the microprogrammable electronic device, cause the microprogrammable electronic device to perform operations comprising:
   disabling operation of the microprogrammable electronic device, in response to detecting the corruption of the code stored in the code memory.

7. The non-transitory medium of claim 5, further bearing instructions that, when executed by the microprogrammable electronic device, cause the microprogrammable electronic device to perform operations comprising:
   computing the signature on the basis of a cyclic redundancy check (CRC).

8. The non-transitory medium of claim 5, wherein computing the signature of the code on the basis of the read second instruction comprises:
   computing the signature of the code on the basis of all instructions stored in the code memory.

9. A method, comprising:
   operating according to instruction cycles, each instruction cycle divided into a respective first and a respective second operating phase;
   reading a first instruction from a code memory storing a code at the first operating phase of an instruction cycle;
   decoding and executing the read first instruction at the second operating phase of the instruction cycle;
   reading a second instruction from the code memory at the second operating phase of the instruction cycle concurrently with decoding and executing the first read instruction, the second operating phase having a length equal to a length of the first operating phase;
   computing a signature of the code on the basis of the read second instruction; and
   detecting a corruption of the code stored in the code memory on the basis of the computed signature differing from a reference signature.

10. The method of claim 9, further comprising:
    disabling operation of the microprogrammable electronic device, in response to detecting the corruption of the code stored in the code memory.

11. The method of claim 9, further comprising:
    computing the signature on the basis of a cyclic redundancy check (CRC).

12. The method of claim 9, wherein computing the signature of the code on the basis of the read second instruction comprises:
    computing the signature of the code on the basis of all instructions stored in the code memory.

* * * * *